(12) United States Patent
Falk et al.

(10) Patent No.: US 7,605,224 B2
(45) Date of Patent: Oct. 20, 2009

(54) REACTING ALKYLENE OXIDE AND GLYCIDY ETHER TO PRODUCE OH- OR ACID-TERMINATED COPOLYMER

(75) Inventors: Uwe Falk, Bruchkoebel (DE); Hendrik Ahrens, Frankfurt am Main (DE); Klaus Poellmann, Burghausen (DE); Martin Glos, Muehldorf (DE); Eckart Kraemer, Wiesbaden (DE)

(73) Assignee: Clariant Produkte (Deutschland) GmbH, Frankfurt (DE)

( * ) Notice: Subject to any disclaimer, the term of this patent is extended or adjusted under 35 U.S.C. 154(b) by 0 days.

(21) Appl. No.: 12/152,412

(22) Filed: May 14, 2008

(65) Prior Publication Data

US 2008/0227917 A1 Sep. 18, 2008

Related U.S. Application Data

(62) Division of application No. 10/525,151, filed on Feb. 18, 2008, now Pat. No. 7,388,068.

(51) Int. Cl.
*C08G 65/28* (2006.01)

(52) U.S. Cl. ........................ 528/365; 525/404; 525/405; 528/360

(58) Field of Classification Search ........................ None
See application file for complete search history.

(56) References Cited

U.S. PATENT DOCUMENTS

| | | | | |
|---|---|---|---|---|
| 4,814,514 | A | * | 3/1989 | Yokota et al. ............... 568/608 |
| 4,966,981 | A | * | 10/1990 | Takai et al. ................. 549/215 |
| 5,296,627 | A | * | 3/1994 | Tang et al. .................. 558/34 |
| 5,332,854 | A | * | 7/1994 | Yokota et al. ................ 558/33 |
| 5,380,784 | A | * | 1/1995 | Usuki et al. ................. 524/407 |

FOREIGN PATENT DOCUMENTS

| DE | 10104070 | A1 | * | 8/2001 |
|---|---|---|---|---|
| JP | 61-85429 | A | * | 5/1986 |
| JP | 61-134335 | A | * | 6/1986 |
| JP | 11-71340 | A | * | 3/1999 |
| JP | 2002-80506 | A | * | 3/2002 |
| JP | 2002-97212 | A | * | 4/2002 |

OTHER PUBLICATIONS

Urquiloa et al., "Emuision Polymerization of Vinyl Acetate Using a Polymerizable Surfactant, I. Kinetic Studies," Journal of Polymer Science, vol. 30, 1992, pp. 2619-2629.*
Urquiola et al., Emusion Polymerization of Vinyl Acetate Using a Polymerizable Surfactant, III. Mathematical Model, Journal of Polymer Science, vol. 331, 1993, pp. 1403-1413.*

* cited by examiner

*Primary Examiner*—Robert Sellers
(74) *Attorney, Agent, or Firm*—Richard P. Silverman; Tod A. Waldrop

(57) ABSTRACT

Disclosed are copolymers made of alkylene oxides and glycidyl ethers according to formula (I)

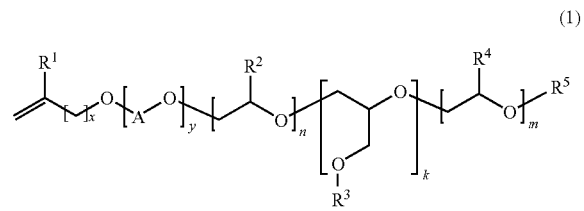

(1)

in which $R^1$ is hydrogen or a $C_1$-$C_4$-alkyl radical, $R^2$ and $R^4$ are an alkyl or aryl radical having 1 to 30 carbon atoms, and $R^3$ is an alkyl or aryl radical having 1 to 50 carbon atoms, which may also contain heteroatoms. A is an alkylene unit having 2 to 6 carbon atoms. In formula (1), x is a number from 0 to 10, y is a number from 0 to 10, n is a number from 0 to 100, k is a number from 1 to 100, $R^5$ is an acid group or hydrogen, and m is a number from 1 to 500, with the proviso that (y+n) must be at least 1.

2 Claims, No Drawings

REACTING ALKYLENE OXIDE AND GLYCIDY ETHER TO PRODUCE OH- OR ACID-TERMINATED COPOLYMER

CROSS REFERENCE TO RELATED APPLICATION

This application is a divisional of U.S. application Ser. No. 10/525,151, filed Feb. 18, 2005 U.S. Pat. No. 7,388,068, the disclosure of which is hereby incorporated herein by reference.

The present invention relates to copolymers made of alkylene oxides and glycidyl ethers which can be used as free-radically polymerizable emulsifiers for emulsion polymerization.

The emulsifiers used for emulsion polymerization according to the prior art are in most cases anionic and nonionic emulsifiers.

Customary anionic emulsifiers are sodium, potassium and ammonium salts of fatty acids, sodium alkylbenzenesulfonates, sodium alkylsulfonates, sodium olefinsulfonates, sodium polynaphthalenesulfonates, sodium dialkyl diphenyl ether disulfonates, sodium, potassium and ammonium alkyl sulfates, sodium, potassium and ammonium alkyl polyethylene glycol ether sulfates, sodium, potassium and ammonium alkylphenol polyethylene glycol ether sulfates, sodium, potassium and ammonium mono- and dialkyl sulfosuccinates and monoalkyl polyoxyethyl sulfosuccinates, and also alkyl polyethylene glycol ether phosphoric mono-, di- and triesters and mixtures thereof and alkylphenol polyethylene glycol ether phosphoric mono-, di- and triesters and mixtures thereof, and the sodium, potassium and ammonium salts thereof.

The nonionic emulsifiers customarily used are alkylphenol polyethylene glycol ethers, alkyl polyethylene glycol ethers, fatty acid polyethylene glycol ethers, ethylene/propylene glycol block polymers and sorbitan ester polyethylene glycol ethers.

Emulsion polymerizations are carried out using anionic and nonionic emulsifiers usually with the total batch as the initial charge or in a feed process in which only a small part of the monomers to be polymerized is initially introduced into the polymerization vessel and the larger part (50 to 100% by weight) is added as the polymerization progresses. The anionic or nonionic emulsifiers are used as desired during the emulsion polymerization in the feed or in the reactor initial charge, or are added subsequently to the prepared polymer dispersion for stabilization.

In this connection, the emulsifiers used according to the prior art are bonded to the surface of the polymer particles via physical forces.

EP-A-0 244 841 discloses surface-active components with a polymerizable unit which can be chemically incorporated into the polymer particle by free-radical polymerization reactions. These components are reaction products of glycerol monoallyl ethers with a hydrophobic and a hydrophilic substitution radical on the OH groups of the glycerol monoallyl ether.

J. Polym. Sci., 30 (1992) 2619-2629 and J. Polym. Sci., 31 (1993) 1403-1415 disclose the use of sodium dodecylallyl sulfosuccinate as copolymerizable emulsifier in the emulsion polymerization of vinyl acetate.

EP-A-0 501 666 discloses aqueous polymer dispersions which have been prepared by emulsion polymerization using free-radically polymerizable emulsifiers.

EP-A-0 472 837 discloses (1-propenyl)alkylphenol ethoxylates as emulsifiers for emulsion polymerization. EP-A-0 464 454 discloses the sulfuric esters of the (1-propenyl) alkylphenol ethoxylates as emulsifiers for emulsion polymerization.

JP-A-11-71340 discloses allyl- and vinylpolyoxyalkylenylalkylsulfonates as emulsifiers for emulsion polymerization, as dispersants for suspension polymerization and as polymer modifiers.

JP-A-2002-080506 discloses polymerizable emulsifiers with 3-methyl-3-buten-1-yl radicals which may contain glycidyl units.

JP-A-2002-097212 discloses polymerizable emulsifiers with allyl groups bonded directly to the glycidyl radical.

It was therefore an object of the present invention to find novel emulsifiers for emulsion polymerization. These emulsifiers should copolymerize with the monomers used and thus be bonded chemically in the polymer particles, and produce polymers with advantageous properties, such as improved stability of the polymer dispersions which can be prepared therewith and a more homogeneous particle size distribution.

It has now been found that using copolymers made of alkylene oxides and glycidyl ethers which carry a double bond as reactive group, and also partial esters, sulfonic acids and carboxylic acids thereof as emulsifiers in the emulsion polymerization, it is possible to prepare stable and low-coagulum polymer dispersions.

The invention thus provides copolymers made of alkylene oxides and glycidyl ethers according to formula (I)

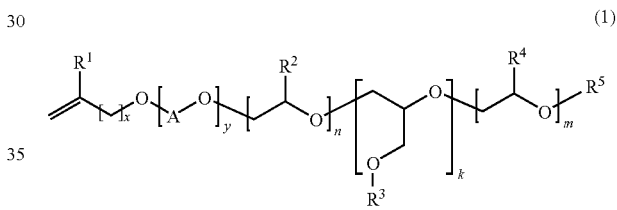

in which $R^1$ is hydrogen or a $C_1$-$C_4$-alkyl radical, $R^2$ and $R^4$ are an alkyl or aryl radical having 1 to 30 carbon atoms, $R^3$ is an alkyl or aryl radical having 1 to 50 carbon atoms which may also contain heteroatoms, A is an alkylene unit having 2 to 6 carbon atoms, x is a number from 0 to 10, y is a number from 0 to 10, n is a number from 0 to 100, k is a number from 1 to 100, $R^5$ is an acid group or hydrogen, and m is a number from 1 to 500, with the proviso that (y+n) must be at least 1.

The invention further provides those compounds of the formula 1 in which x, y and n are simultaneously zero, and in which $R^1$, $R^2$, $R^3$, $R^4$, A, $R^5$ and have the meaning given above.

The emulsifiers according to the invention are notable for the fact that the reactive double bond is bonded to the glycerol unit in the molecule via the alkoxy units with the indices y and n as flexible "spacer". The "spacer" can additionally contribute to the stabilization of the polymer dispersion.

In a preferred embodiment of the invention, the alcohols of the formula 1 are those alkoxylates whose alkoxy groups are arranged in blocks.

x in a preferred embodiment is 0 or 1.

y in a preferred embodiment is 0 or 1.

n in a preferred embodiment is a number from 2 to 50, in particular 3 to 30.

k in a preferred embodiment is a number from 1 to 50, in particular 2 to 30.

m in a preferred embodiment is a number from 2 to 100, in particular 3 to 50.

$R^2$ and $R^4$ in a preferred embodiment are a hydrogen atom or a methyl group.

The sum (y+n) is preferably at least 2, in particular at least 3 and specifically at least 4.

Examples of inorganic acids which are suitable for the formation of the partial esters according to the invention and from which the acid group $R^5$ can be derived are sulfuric acid and phosphoric acid. If phosphoric acid is used, then the partial esters according to the invention may either be monoesters or diesters of phosphoric acid.

In a preferred embodiment, the organic or inorganic acids used for the esterification of the alcohols according to formula 1 are dibasic or tribasic.

In a preferred embodiment, the organic acids are dibasic, tribasic or polybasic carboxylic acids, i.e. compounds which contain 2, 3 or more carboxyl groups and which moreover can also have at least one sulfur- or phosphorus-containing functional group. Particular preference is given to sulfur-containing functional groups, specifically sulfonate groups.

The particularly preferred sulfonic acids/sulfonates may be aliphatic or aromatic compounds. Preferred sulfonic acids/sulfonates contain 2 or 3 carboxyl groups and, including the carboxyl groups, 3 to 6 carbon atoms. A particularly preferred sulfonic acid is sulfosuccinic acid.

In a preferred embodiment, the sulfonic and carboxylic acids are aromatic or aliphatic compounds which carry one or more acid functions.

Particularly preferred partial esters and acid derivatives thus correspond to the formulae (2) to (7)

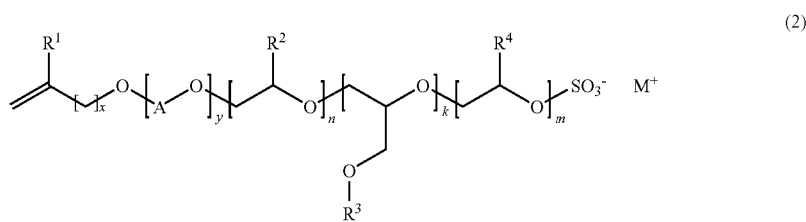

(2)

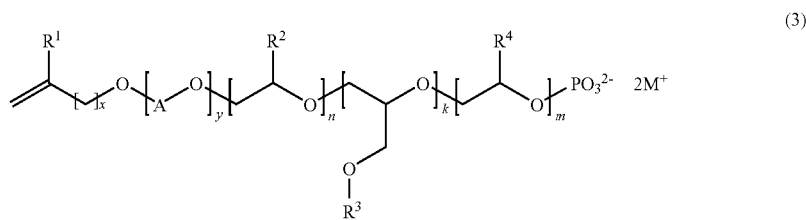

(3)

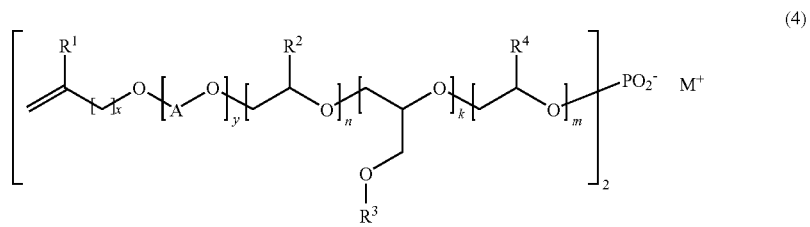

(4)

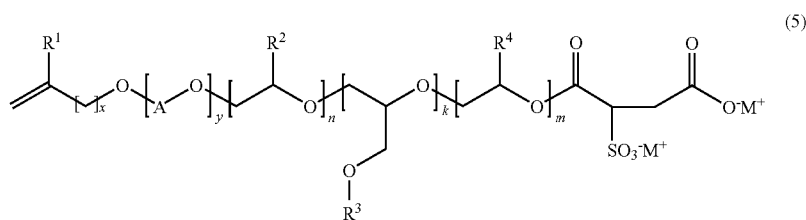

(5)

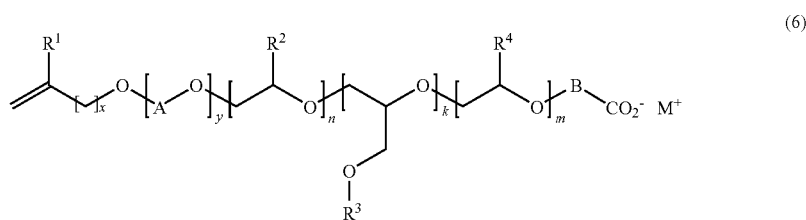

(6)

-continued

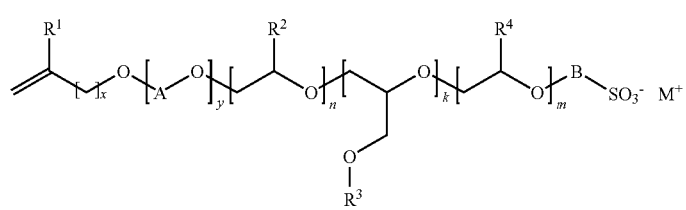

(7)

in which $R^1$, $R^2$, $R^3$, $R^4$, x, y, m, k and n have the meanings given above, M is an alkali metal ion, an ammonium ion or is $H^+$, and B is an aliphatic or aromatic group having 1 to 50 carbon atoms which may also contain heteroatoms.

The partial esters according to the invention can be prepared by reacting the alcohols of the formula 1 with suitable acids. However, it is to be ensured that the acids do not have an oxidizing effect since otherwise oxidation of the double bond is possible. For this reason, the preparation of sulfate partial esters is preferably carried out with amidosulfonic acid instead of with sulfuric acid. The resulting ammonium salts can be converted to the corresponding alkali metal salts by reaction with alkali metal hydroxides. For the preparation of phosphoric partial esters, it is possible to use phosphoric acid. Organic acids are preferably reacted in the form of their anhydrides with the alcohols of the formula 1. The insertion of functional groups preferably takes place following the preparation of the partial ester of the nonfunctionalized acid. Thus, the preparation of the sulfosuccinic esters according to formula 5 can be carried out by preparing the corresponding maleic esters and subsequent sulfonation, e.g. with pyrosulfites.

The sulfonic acids, carboxylic acids and phosphonic acids are prepared by reacting the alcohols of the formula 1 with the corresponding alcohols, halides or cyclic esters of sulfonic or carboxylic acids.

The invention further provides the use of the copolymers according to the invention as polymerizable emulsifiers in emulsion polymerization.

The invention further provides a process for emulsion polymerization in which the copolymers according to the invention are added to the reaction mixture.

In this use, the copolymers according to the invention are polymerized with further monomers from which a polymer dispersion is to be prepared. Unsaturated monomers are suitable for the preparation of polymer dispersions. Preferred olefinically unsaturated monomers are, for example, vinyl monomers, such as carboxylic esters of vinyl alcohol, for example vinyl acetate, vinyl propionate, vinyl ethers of isononanoic acid or of isodecanoic acid, aryl-substituted olefins, such as styrene and stilbene olefinically unsaturated carboxylic esters, such as methyl acrylate, ethyl acrylate, propyl acrylate, n-butyl acrylate, isobutyl acrylate, pentyl acrylate, hexyl acrylate, 2-ethylhexyl acrylate, hydroxyethyl acrylate, and the corresponding methacrylic esters, olefinically unsaturated dicarboxylic esters, such as dimethyl maleate, diethyl maleate, dipropyl maleate, dibutyl maleate, dipentyl maleate, dihexyl maleate, di-2-ethylhexyl maleate, olefinically unsaturated carboxylic acids and dicarboxylic acids, such as acrylic acid, methacrylic acid, itaconic acid, maleic acid and fumaric acid and their sodium, potassium and ammonium salts, olefinically unsaturated sulfonic acids and phosphonic acids and their alkali metal and ammonium salts, such as acrylamidomethyl-propanesulfonic acid and its alkali metal and ammonium, alkyl-ammonium and hydroxyalkylammonium salts, allylsulfonic acid and its alkali metal and ammonium salts, acryloyloxyethylphosphonic acid and its ammonium and alkali metal salts, and also the corresponding methacrylic acid derivatives, olefinically unsaturated amines, ammonium salts, nitriles and amides, such as dimethylaminoethyl acrylate, acryloyloxyethyl-trimethylammonium halides, acrylonitrile, N-methylacrylamide, N-ethylacrylamide, N-propylacrylamide, N-methylolacrylamide, and the corresponding methacrylic acid derivatives and vinylmethylacetamide.

In a preferred embodiment, the abovementioned monomers are polymerized with further comonomers, preferably olefins or halogenated olefins with 2 to 8 carbon atoms, such as, for example, ethylene, propene, butenes, pentenes, 1,3-butadiene, chloroprene, vinyl chloride, vinylidene chloride, vinylidene fluoride and tetrafluoroethylene.

The invention consequently provides a process for the preparation of polymer dispersions by polymerizing the copolymers according to the invention with olefinically unsaturated monomers in the aqueous phase, and also the aqueous polymer dispersion preparable in this way.

To prepare the polymer dispersions, the water-immiscible monomers are generally finely distributed in the aqueous phase in the form of micelles using the copolymers according to the invention, and the free-radical polymerization reaction is started by initiators such as, for example, ammonium peroxodisulfate, sodium peroxodisulfate and potassium peroxodisulfates.

Further auxiliaries and additives for the use with the copolymers according to the invention may be protective colloids, such as carboxymethylcellulose, hydroxyethylcellulose, methylhydroxypropylcellulose, and also partially and completely saponified polyvinyl alcohol.

A review of common processes, surfactants and further auxiliaries of emulsion polymerization is given by Peter A. Lovell and Mohamed S. El-Aasser, in "Emulsion Polymerization and Emulsion Polymers", published by John Wiley and Sons, 1997.

The copolymers according to the invention are initially introduced into the reaction vessel prior to the start of the polymerization reaction or added to the reaction vessel during the polymerization reaction.

In general, the copolymers according to the invention are used as emulsifiers in amounts of from 0.1 to 50% by weight, preferably 0.2 to 10% by weight, in particular 0.4 to 4% by weight, based on the weight of the water-insoluble or sparingly water-soluble olefinically unsaturated monomers used for the preparation of the polymer dispersion.

The copolymers according to the invention can either be used on their own or else in combination with other already known anionic and nonionic emulsifiers of the prior art, as described at the beginning. The amount of anionic and nonionic emulsifiers of the prior art is then preferably 0.001 to 5% by weight, in particular 0.01 to 1% by weight and particularly preferably 0.02 to 0.4% by weight, based on the weight of the water-insoluble or sparingly water-soluble olefinically unsaturated monomers.

The polymer dispersions prepared using the copolymers according to the invention exhibit low coagulum formation during and after polymerization, and an improvement in the shear stability, thermal stability and storage stability, the freeze/thaw stability and the electrolyte stability toward divalent and trivalent cations such as calcium, barium and aluminum. In addition, an improvement in the film properties of the polymer films prepared from the polymer dispersions is observed. The polymer dispersions prepared using the copolymers according to the invention form films with low water absorption, low blushing upon contact with water, a small contact angle toward water and good wet and dry rubbing fastnesses. The polymer dispersions prepared with the copolymers according to the invention exhibit very small particle sizes with very narrow particle size distributions, depending on the monomer composition and the amount used.

EXAMPLES

Preparation of copolymers of alkylene oxides and glycidyl ethers with allyl units (formula 1).

Example 1

Ethylene Oxide-Phenyl Glycidyl Ether Copolymer Initiated with Allyl Alcohol Mw ca. 1300 g/mol 1 mol of allyl alcohol was partially reacted with 0.1 mol of sodium methanolate in an inert solvent (monoglyme) in a laboratory autoclave to give the alkoxide. Methanol was distilled off. 5 mol of ethylene oxide were then added and the mixture was polymerized under pressure for 5 hours at about 140° C. 1.1 mol of phenyl glycidyl ether were added dropwise to this reaction product and stirred for 15 hours at 90° C. and then a further 20 mol of ethylene oxide were added at 140° C. After the ethylene oxide had completely reacted, the product was analyzed using NMR spectroscopy and OH number determination.

The OH number was 44.5 mg of KOH/g

The NMR spectrum corresponded to the following structures:

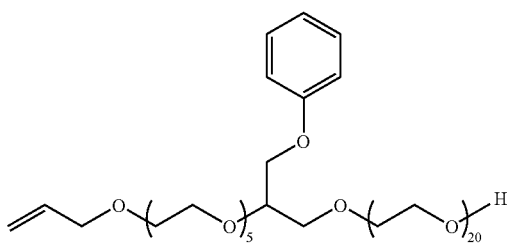

-continued

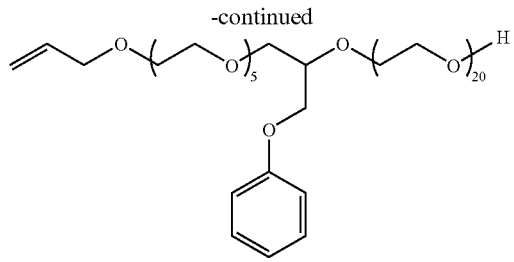

Example 2

Propylene Oxide-Ethylene Oxide-Phenyl Glycidyl Ether Copolymer Initiated with Allyl Alcohol Mw 1000 g/mol 1 mol of allyl alcohol was partially reacted with 0.1 mol of potassium methanolate in an inert solvent (monoglyme) in a laboratory autoclave to give the alkoxide. Methanol was distilled off. 4 mol of propylene oxide were then added and the mixture was polymerized under pressure for 5 hours at about 140° C. 1.1 mol of phenyl glycidyl ether were added dropwise to this reaction product and stirred again for 15 hours at 90° C. 12 mol of ethylene oxide were then added at 140° C. After the ethylene oxide had completely reacted, the product was analyzed using NMR spectroscopy and OH number determination.

The OH number was 57.9 mg of KOH/g

The NMR spectrum corresponded to the following structures:

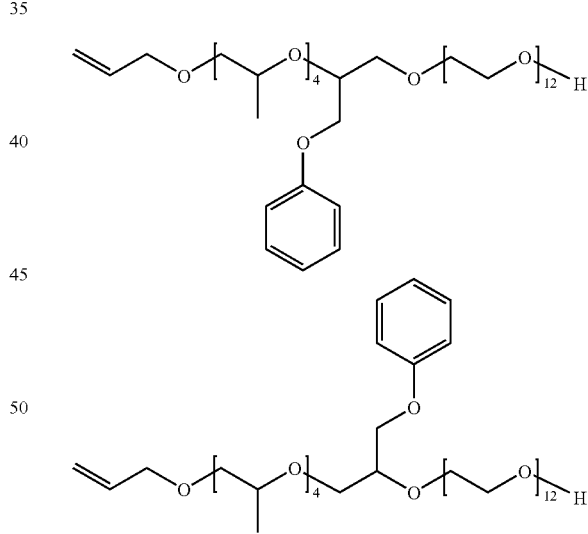

Example 3

Propylene Oxide-Ethylene Oxide-Phenyl Glycidyl Ether Copolymer Initiated with Allyl Alcohol Mw 1500 g/mol 1 mol of allyl alcohol was partially reacted with 0.1 mol of potassium methanolate in an inert solvent (monoglyme) in a laboratory autoclave to give the alkoxide. Methanol was distilled off. 4 mol of propylene oxide were then added and polymerized under pressure for 5 hours at about 140° C. 1.1 mol of phenyl glycidyl ether were added dropwise to this reaction product, and stirred again for 15 hours at 90° C. 25 mol of ethylene oxide were then added at 140° C. After the ethylene oxide had completely reacted, the product was analyzed using NMR spectroscopy and OH number determination.

The OH number was 40.5 mg of KOH/g

The NMR spectrum corresponded to the following structures:

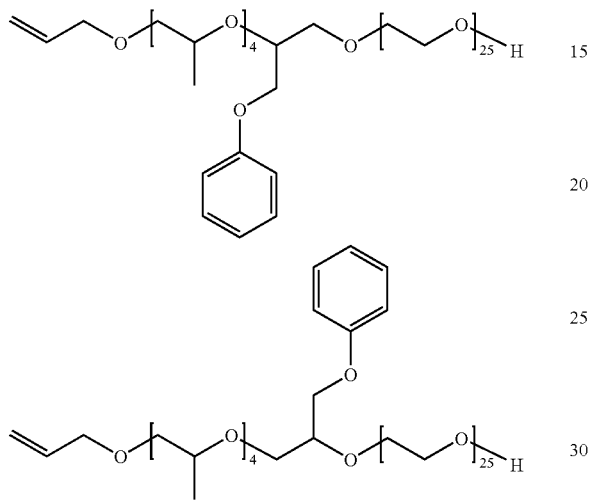

Example 4

Butylene Oxide-Ethylene Oxide-(2-Ethylhexyl) Glycidyl Ether Copolymer Initiated with Allyl Alcohol Mw 1700 g/mol 1 mol of allyl alcohol was partially reacted with 0.1 mol of potassium methanolate in an inert solvent (monoglyme) in a laboratory autoclave to give the alkoxide. Methanol was distilled off. 4 mol of butylene oxide were then added and polymerized under pressure for 5 hours at about 140° C. 1.1 mol of (2-ethylhexyl) glycidyl ether were added dropwise to this reaction product, and stirred again for 15 hours at 90° C. 26 mol of ethylene oxide were then added at 140° C. After the ethylene oxide had completely reacted, the product was analyzed using NMR spectroscopy and OH number determination.

The OH number was 32.9 mg of KOH/g

The NMR spectrum corresponded to the following structures:

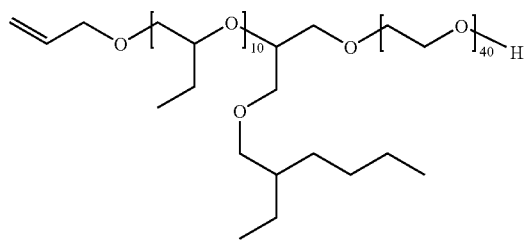

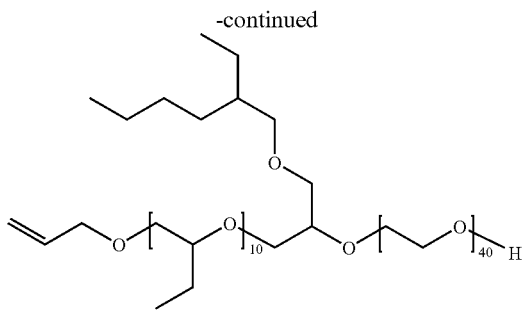

Example 5

Propylene Oxide-Ethylene Oxide-Phenyl Glycidyl Ether Copolymer Initiated with Hydroxybutyl Vinyl Ether, Mw 2600 g/mol 1 mol of hydroxybutyl vinyl ether was partially reacted with 0.1 mol of potassium methanolate in an inert solvent (monoglyme) in a laboratory autoclave to give the alkoxide. Methanol was distilled off. 10 mol of propylene oxide were then added and polymerized under pressure for 5 hours at about 140° C. 1.1 mol of phenyl glycidyl ether were added dropwise to this reaction product, and stirred again for 15 hours at 90° C. 40 mol of ethylene oxide were then added at 140° C. After the ethylene oxide had completely reacted, the product was analyzed using NMR spectroscopy and OH number determination.

The OH number was 20.5 mg of KOH/g

The NMR spectrum corresponded to the following structures:

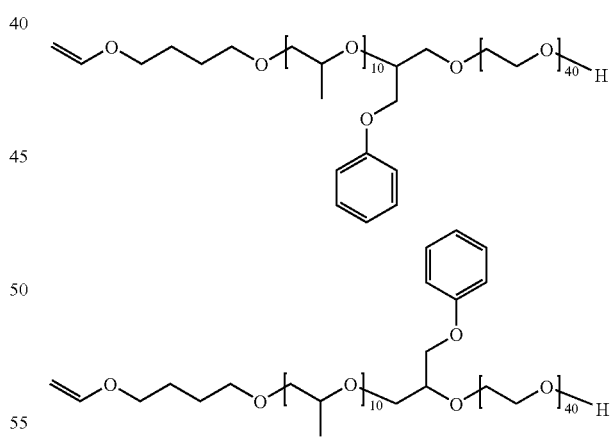

Preparation of Partial Esters

Example 6

197 g of the alcohol from example 2 were admixed, under nitrogen, with 19.4 g of amidosulfonic acid and 0.5 g of 50% strength hypophosphorous acid. The mixture was heated, with vigorous stirring, at 80° C. for 5 h and at 100° C. for 1 h. When the reaction was complete, the mixture was left to cool and admixed with 1.8 g of 20% strength NaOH. 212 g (98%) of the sulfuric monoester were obtained.

Example 7

787 g of the alcohol from example 1 were admixed, under nitrogen, with 60.7 g of amidosulfonic acid and 1.88 g of urea and stirred vigorously at 100° C. for 3 h. When the reaction was complete, the mixture was left to cool and admixed with 2.5 g of 20% strength NaOH. 832 g (98%) of the sulfuric monoester were obtained.

Example 8

428 g of the sulfuric monoester ammonium salt prepared in example 7 were heated to 60° C. At 200 mbar, 105 g of 18% strength NaOH were added dropwise and then the mixture was after-reacted for a further 2 h at 50 mbar, during which the introduced water was driven off together with the ammonia. This gave 421 g (98%) of the sulfuric monoester sodium salt.

Example 9

1275 g of the alcohol from example 4 were admixed, under nitrogen, with 72.8 g of amidosulfonic acid and 2.25 g of urea and stirred vigorously at 120° C. for 8 h. When the reaction was complete, the mixture was left to cool and admixed with 3 g of 20% strength NaOH. 1336 g (99%) of the sulfuric monoester were obtained.

Example 10

634 g of the alcohol from example 1 were admixed, under nitrogen, with 48 g of amidosulfonic acid and 1.5 g of urea. With vigorous stirring, the mixture is heated at 100° C. for 4 h. When the reaction was complete, the mixture was left to cool and 1 g of 18% strength NaOH was added. 677 g (99%) of the sulfuric monoester were obtained.

Example 11

1260 g of the alcohol from example 1 were added dropwise (under nitrogen) to 98 g of maleic anhydride at 70° C. The mixture was then heated at 90° C. for 4 h and added to a mixture of 52 g of sodium pyrosulfite, 40 g of NaOH and 960 g of distilled water and reacted for 5 h at 80° C. 2410 g of sulfosuccinate solution with a content of 60% by weight were obtained.

Example 12

1275 g of the alcohol from example 4 were added dropwise, under nitrogen, to 74 g of maleic anhydride at 70° C. The mixture was then heated at 90° C. for 8 h, during which the water which formed was distilled off. The resulting product was added to a mixture of 39 g of sodium pyrosulfite, 30 g of NaOH and 1430 g of distilled water and heated at 80° C. for 5 h. 2830 g of sulfosuccinate solution with a content of 50% by weight were obtained.

Example 13

606 g of the alcohol from example 2 were admixed with 71 g of poly-phosphoric acid at 70° C. and stirred for 2 h at 70° C. After a further 3 h at 100° C., 24 g of water were added at 90° C. and the mixture was stirred for a further 2 h. This gave 560 g of product, which was a mixture of 80% by weight of phosphoric monoester and 7% by weight of phosphoric diester, remainder water. The product contained no phosphoric triester.

Example 14

1260 g of the alcohol from example 1 were admixed with 113 g of poly-phosphoric acid at 70° C. and stirred for 2 h at 70° C. After a further 2 h at 100° C., 30 g of water were added at 90° C. and the mixture was stirred for a further 2 h. This gave 1400 g of product, which was a mixture of 82% by weight of phosphoric monoester and 8% by weight of phosphoric diester, remainder water. The product contained no phosphoric triester.

Examples of the Preparation of Sulfonic Acids

Example 15

850 g of alcohol from example 4 were admixed, under nitrogen at 50° C., with 81 g of 3-hydroxypropanesulfonic acid sodium salt and 20 g of NaOH prills and stirred for 3 h. The mixture was then stirred for a further 2 h at 70° C. The lower phase was discarded and the upper phase was neutralized with 5 g of acetic acid. This gave 855 g (96%) of the desired sulfonic acid ether.

Example 16

728 g of alcohol from example 2 were admixed, under nitrogen at 50° C., with 174 g of 4-hydroxybenzenesulfonic acid sodium salt dihydrate and 30 g of NaOH prills and stirred for 1 h. The mixture was then stirred for a further 2 h at 70° C. The lower phase was discarded and the upper phase was neutralized with 7 g of acetic acid. This gave 810 g (94%) of the desired sulfonic acid ether.

Example 17

650 g of the alcohol from example 5 were admixed with 11 g of sodium hydroxide prills and dried under reduced pressure for 2 hours at 100° C. 0.25 mol (34 g) of butanesultone were then added dropwise under nitrogen at 90° C. and stirred for 6 hours. The α-vinyloxy-Ω-sulfonate-ethylene oxide-propylene oxide-phenyl glycidyl block copolymer was obtained, according to NMR analysis, with 70% yield. The NMR spectrum corresponded to the following structures:

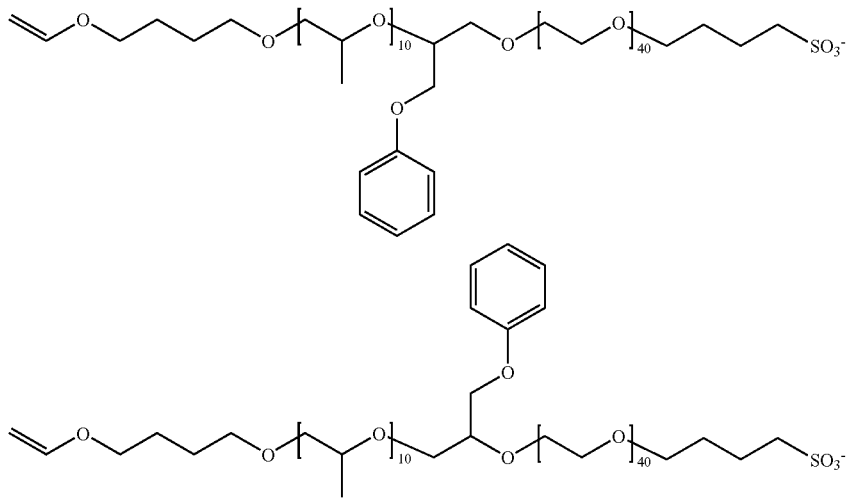

Examples for the Preparation of Carboxylic Acids

Example 18

630 g of alcohol from example 1 were admixed, under nitrogen at 50° C., with 59 g of chloroacetic acid sodium salt and 20 g of NaOH prills and stirred for 3 h. The mixture was then stirred for a further 4 h at 70° C. The lower phase was discarded and the upper phase was neutralized with 6 g of acetic acid. This gave 650 g (97%) of the desired carboxylic acid ether.

Example 19

1275 g of alcohol from example 4 were admixed, under nitrogen at 50° C., with 120 g of 4-hydroxybenzoic acid sodium salt and 30 g of NaOH prills and stirred for 1 h. The mixture was then stirred for a further 2 h at 80° C. The lower phase was discarded and the upper phase was neutralized with 10 g of acetic acid. This gave 1320 g (96%) of the desired carboxylic acid ether.

Preparation of Polymer Dispersions

Example 20

Styrene/Acrylate Dispersion 1020 g of a monomer emulsion consisting of 331.8 g of demineralized water, 4.8 g of ®Emulsogen EPA 073 (sodium alkyl polyethylene glycol ether sulfate, Clariant GmbH), 13.2 g of the sulfuric monoester according to the invention from example 10, 3.6 g of sodium hydrogencarbonate, 216 g of styrene, 300 g of n-butyl acrylate, 144 g of methyl acrylate and 6.6 g of methacrylic acid, and an initiator solution consisting of 3.33 g of ammonium peroxodisulfate and 85.5 ml of demineralized water were prepared.

204.54 g of demineralized water were initially introduced into a 2 liter reaction vessel, and 6.6 g of the sulfuric monoester according to the invention from example 10 were added. Under a nitrogen atmosphere and with stirring using an anchor stirrer, the emulsifier solution was heated to 80° C. in the reaction vessel. 22.2 ml of initiator solution and 25.5 ml of the monomer emulsion were then added. The free-radical polyaddition reaction starts. The reaction mixture was cooled and kept constant at 79-81° C. over the water bath. The remaining 994.5 g of the monomer emulsion and 66.6 g of the initiator solution were added over a period of 3 hours. The reaction mixture was then kept for a further hour at 80° C. over the water bath and then cooled to room temperature. The pH of the prepared polymer dispersion was adjusted to pH 7-8 using 12.5% strength ammonia solution.

The resulting polymer dispersion has a solids content of 52% and a coagulum of <0.006% through a 100 µm sieve and of <0.006% through a 40 µm sieve, based on the dispersion. The average particle size ($Z_{AVE}$), measured by means of dynamic light scattering, is 144 nm with a polydispersity of 0.035.

Example 21

Styrene/Acrylate Dispersion 1020 g of a monomer emulsion consisting of 336.6 g of demineralized water, 13.2 g of the sulfuric monoester according to the invention as in example 10, 3.6 g of sodium hydrogencarbonate, 216 g of styrene, 300 g of n-butyl acrylate, 144 g of methyl acrylate and 6.6 g of methacrylic acid, and an initiator solution consisting of 3.33 g of ammonium peroxodisulfate and 85.5 ml of demineralized water were prepared.

204.54 g of demineralized water were initially introduced into a 2 liter reaction vessel and 6.6 g of the sulfuric monoester according to the invention from example 10 were added. Under a nitrogen atmosphere and with stirring using an anchor stirrer, the emulsifier solution in the reaction vessel was heated to 80° C. 22.2 ml of initiator solution and 25.5 ml of the monomer emulsion were then added. The free-radical polyaddition reaction starts. The reaction mixture was cooled and kept constant at 79-81° C. over the water bath. The remaining 994.5 g of the monomer emulsion and 66.6 g of the initiator solution were added over a period of 3 hours. Then, over the water bath, the reaction mixture was kept at 80° C. for a further hour and then cooled to room temperature. The pH of the prepared polymer dispersion was adjusted to pH 7-8 with 12.5% strength ammonia solution.

The resulting polymer dispersion had a solids content of 52% and a coagulum of <0.008% through a 100 µm sieve and of <0.008% through a 40 µm sieve, based on the dispersion.

The average particle size ($Z_{AVE}$), measured by means of dynamic light scattering, is 132 nm with a polydispersity of 0.028.

Example 22

Straight Acrylate Dispersion 1800 g of a monomer emulsion consisting of 397.2 g of demineralized water, 9.6 g of Emulsogen EPA 073 (sodium alkyl polyethylene glycol ether sulfate), 27.0 g of the sulfuric monoester according to the invention as in example 10, 2.2 g of dodecyl mercaptan, 150 g of methyl methacrylate, 350 g of 2-ethylhexyl acrylate, 850 g of n-butyl acrylate and 14 g of methacrylic acid, and 57 g of an initiator solution consisting of 7.1 g of ammonium peroxodisulfate and 49.9 g of demineralized water were prepared.

263 g of demineralized water were initially introduced into a 3 liter reaction vessel and heated to 80° C. under a nitrogen atmosphere over a water bath. 17 g of the initiator solution were then added, and the continuous addition of the 1800 g of monomer emulsion and the remaining 40 g of initiator solution was immediately started. The metered addition of the two components was carried out with continuous stirring using an anchor stirrer and under a nitrogen atmosphere over a period of 3 hours. The reaction mixture was then heated at 80° C. for a further hour and then cooled to room temperature. The pH of the prepared polymer dispersion was adjusted to pH 7-8 using 12.5% strength ammonia solution.

The resulting polymer dispersion had a solids content of 65% and a coagulum of <0.1% through a 100 μm sieve and of <0.2% through a 40 μm sieve, based on the dispersion.

Example 23

Styrene/Acrylate Dispersion 1020 g of a monomer emulsion consisting of 331.8 g of demineralized water, 6.6 g of the alcohol according to the invention from example 1, 6.6 g of ®Emulsogen EPA 073 (sodium alkylpolyethylene glycol ether sulfate, Clariant GmbH), 3.6 g of sodium hydrogencarbonate, 216 g of styrene, 300 g of n-butyl acrylate, 144 g of methyl acrylate and 6.6 g of methacrylic acid, and an initiator solution consisting of 3.33 g of ammonium peroxodisulfate and 85.5 ml of demineralized water were prepared.

204.54 g of demineralized water were initially introduced into a 2 liter reaction vessel and 6.6 g of the sulfuric monoester according to the invention were added. Under a nitrogen atmosphere and with stirring using an anchor stirrer, the emulsifier solution was heated to 80° C. in the reaction vessel. 22.2 ml of initiator solution and 25.5 ml of the monomer emulsion were then added. The free-radical polyaddition reaction starts. The reaction mixture was cooled and kept constant at 79-81° C. over the water bath. The remaining 994.5 g of the monomer emulsion and 66.6 g of the initiator solution were added over a period of 3 hours. Then, over the water bath, the reaction mixture was kept at 80° C. for a further hour and then cooled to room temperature. The pH of the prepared polymer dispersion was adjusted to pH 7-8 with 12.5% strength ammonia solution.

The resulting polymer dispersion had a solids content of 52% and a coagulum of <0.1% through a 100 μm sieve and of <0.15% through a 40 μm sieve, based on the dispersion.

Example 24

Styrene/Acrylate Dispersion 1020 g of a monomer emulsion consisting of 331.8 g of demineralized water, 6.6 g of the alcohol according to the invention from example 1, 6.6 g of the alcohol according to the invention from example 10, 3.6 g of sodium hydrogencarbonate, 216 g of styrene, 300 g of n-butyl acrylate, 144 g of methyl acrylate and 6.6 g of methacrylic acid, and an initiator solution consisting of 3.33 g of ammonium peroxodisulfate and 85.5 ml of demineralized water were prepared.

204.54 g of demineralized water were initially introduced into a 2 liter reaction vessel and 6.6 g of the sulfuric monoester according to the invention were added. Under a nitrogen atmosphere and with stirring using an anchor stirrer, the emulsifier solution was heated to 80° C. in the reaction vessel. 22.2 ml of initiator solution and 25.5 ml of the monomer emulsion were then added. The free-radical polyaddition reaction starts. The reaction mixture was cooled and kept constant at 79-81° C. over the water bath. The remaining 994.5 g of the monomer emulsion and 66.6 g of the initiator solution were added over a period of 3 hours. Then, over the water bath, the reaction mixture was kept at 80° C. for a further hour and then cooled to room temperature. The pH of the resulting polymer dispersion was adjusted to pH 7-8 with 12.5% strength ammonia solution.

The resulting polymer dispersion had a solids content of 52% and a coagulum of <0.01% through a 100 μm sieve and of <0.05% through a 40 μm sieve, based on the dispersion.

Vinyl Acetate/Acrylate Dispersion 960 g of a monomer emulsion consisting of 271.44 g of demineralized water, 11.76 g of ®Emulsogen EPA 073 (sodium alkyl polyethylene glycol ether sulfate, Clariant GmbH), 6.6 g of the sulfuric monoester according to the invention from example 10, 3.6 g of sodium hydrogencarbonate, 528 g of vinyl acetate, 128 g of n-butyl acrylate and 6.6 g of methacrylic acid, and an initiator solution consisting of 2.33 g of ammonium peroxodisulfate and 59.87 ml of demineralized water were prepared.

293.09 g of demineralized water were initially introduced into a 2 liter reaction vessel and 4.69 g of ®Emulsogen EPA 073 (sodium alkyl polyethylene glycol ether sulfate, Clariant GmbH) and 0.12 g of sodium disulfite were added. Under a nitrogen atmosphere and with stirring using an anchor stirrer, the emulsifier solution was heated to 80° C. in the reaction vessel. 18.66 ml of initiator solution and 24 ml of the monomer emulsion were then added. The free-radical polyaddition reaction starts. The reaction mixture is cooled and kept constant at 79-81° C. over the water bath. The remaining 936 g of the monomer emulsion and 43.54 g of the initiator solution were added over a period of 3.5 hours. Then, over the water bath, the reaction mixture was kept at 80° C. for a further hour and then cooled to room temperature.

The resulting polymer dispersion has a solids content of 51% and a coagulum of <0.007% through a 100 μm sieve and of <0.013% through a 40 μm sieve, based on the dispersion. The average particle size ($Z_{AVE}$), measured by means of dynamic light scattering, is 149 nm with a polydispersity of 0.026.

Vinyl Acetate/Acrylate Dispersion 960 g of a monomer emulsion consisting of 279.9 g of demineralized water, 13.2 g of the sulfuric monoester according to the invention from example 10, 3.6 g of sodium hydrogencarbonate, 528 g of vinyl acetate, 128 g of n-butyl acrylate and 6.6 g of methacrylic acid, and an initiator solution consisting of 2.33 g of ammonium peroxodisulfate and 59.87 ml of demineralized water were prepared.

296.46 g of demineralized water were initially introduced into a 2 liter reaction vessel, and 1.32 g of the sulfuric monoester according to the invention from example 10 and 0.12 g of sodium disulfite were added. Under a nitrogen atmosphere and with stirring using an anchor stirrer, the emulsifier solution was heated to 80° C. in the reaction vessel. 18.66 ml of initiator solution and 24 ml of the monomer emulsion were then added. The free-radical polyaddition reaction starts. The reaction mixture was cooled and kept constant at 79-81° C. over the water bath. The remaining 936 g of the monomer emulsion and 43.54 g of the initiator solution were added over a period of 3.5 hours. Then, over the water bath, the reaction mixture was kept at 80° C. for a further hour and then cooled to room temperature.

The resulting polymer dispersion has a solids content of 51% and a coagulum of <0.005% through a 100 μm sieve and of <0.007% through a 40 μm sieve, based on the dispersion. The average particle size ($Z_{AVE}$), measured by means of dynamic light scattering, is 240 nm with a very narrow polydispersity of 0.009.

The invention claimed is:

1. A process for producing a copolymer of formula (1), said process comprising reacting an alkylene oxide and a glycidyl ether in an emulsion polymerization reaction

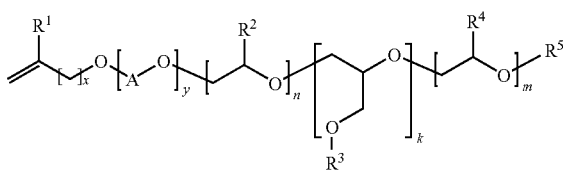

(1)

in which $R^1$ is hydrogen or a $C_1$-$C_4$-alkyl radical, $R^2$ and $R^4$ are an alkyl or aryl radical having 1 to 30 carbon atoms, $R^3$ is an alkyl or aryl radical having 1 to 50 carbon atoms which optionally contains heteroatoms, A is an alkylene unit having 2 to 6 carbon atoms, x is a number from 0 to 10, y is a number from 0 to 10, n is a number from 0 to 100, k is a number from 1 to 100, $R^5$ is an acid group or hydrogen, and m is a number from 1 to 500, with the proviso that (y+n) must be at least 1.

2. The process of claim 1, in which $R^5$ is the radical of a dibasic acid or tribasic acid.

* * * * *